April 3, 1945.  C. HUNGERFORD, JR  2,372,952
CONDENSATE RECLAIMING SYSTEM
Filed Jan. 6, 1943

INVENTOR
Churchill Hungerford Jr.
BY
Synnestvedt & Lechner
ATTORNEYS

Patented Apr. 3, 1945

2,372,952

UNITED STATES PATENT OFFICE 2,372,952

CONDENSATE RECLAIMING SYSTEM

Churchill Hungerford, Jr., Woodbury, N. J., assignor to Hungerford & Terry, Inc., Clayton, N. J., a corporation of Delaware Application January 6, 1943, Serial No. 471,436

7 Claims. (Cl. 210—44)

This invention relates to a method of and apparatus for reclaiming contaminated condensate, and is especially intended for use on ocean-going ships where the major portion of the water used for the power plant is evaporated from sea water. However, the invention is not necessarily limited to this field of service, although its objects will be more fully appreciated and its advantages more fully realized in marine installations.

As is well known, the present intensified ship building program incident to the war has made heavy demands upon the facilities available for the production of steam turbines and Diesel motors so that it has been necessary in many instances to turn to the older reciprocating steam engine for much of the needed power equipment. Modern reciprocating steam engines operate with a very high cylinder temperature, which has a tendency to vaporize comparatively large quantities of the cylinder lubricating oil, which vapor naturally passes out of the cylinders with the exhaust steam and since, in marine installations, it is important to reclaim the condensate in order to reduce the load upon the boilers to as great an extent as possible, this content of condensed oil vapor in the condensate presents a problem of no little seriousness because the condensate cannot be used for make-up water without first removing the oil therefrom. The oil contaminated condensate is generally treated with certain coagulating chemicals and is then put through a suitable filtering operation, after which the condensate can be reused for make-up water. The filters, of course, must be periodically cleaned, and my invention relates specifically to such a filtering system for removing the oil from the condensate and reclaiming not only the condensate in clean condition, but also the greater percentage of any water which is employed in washing the filters.

With the foregoing in mind, the principal objects of my invention may be recited as including the provision of a condensate reclaiming system in which most of the wash water used in the filters is reclaimed and delivered to the system for further chemical treatment and subsequent filtering so that the total quantity of wash water required is substantially reduced in volume; and the provision of a condensate reclaiming system which will materially reduce the load on the boilers where the water employed must be evaporated from sea or other water unsuitable for boiler feed.

Other objects and advantages will occur to those skilled in this art in connection with the following description of the accompanying drawing, wherein—

Figures 1, 2:
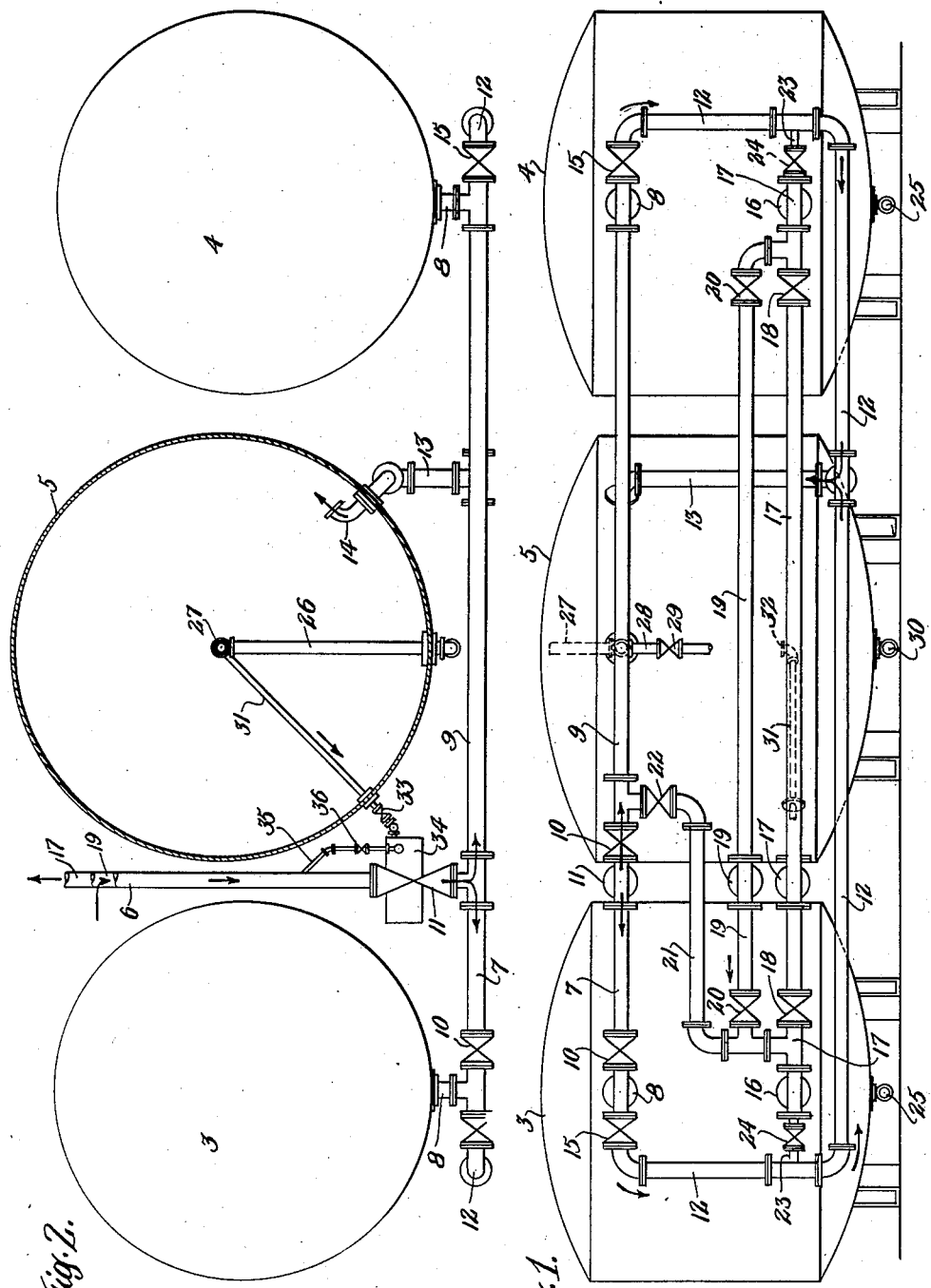
Figure 1 is a side elevation of my improved condensate reclaiming system.
Figure 2 is a plan view of the same with the settling tank which I employ shown in horizontal section to illustrate certain details of the interior thereof.

In the drawing I have illustrated a pair of exactly similar filters 3 and 4 between which is located a suitable settling tank 5 of somewhat larger capacity than either of the filters 3 or 4. The filters may be of any desired type, the details of which are not shown because, per se, they form no part of the present invention. Suffice it to say that they are provided with suitable filter beds through which the contaminated water passes in a downward direction during the filtering operation. It is not necessary, of course, to employ two filters, although for purposes of more or less continuous operation, two filters are desirable and have, therefore, been illustrated.

The oil contaminated condensate, after it has accumulated in a suitable tank or tanks (not shown) and after it has been chemically treated in the usual way, passes through the filter supply pipe 6, one branch 7 of which delivers to the filter 3 through the connection 8 near the top, and the other branch 9 to the filter 4 through a similar connection 8. The branches 7 and 9 are each provided with a condensate inlet control valve 10, and the main supply pipe 6 is provided with a master control valve 11.

Beyond the filter connections 8 the branch supply pipes 7 and 9 are connected respectively to wash water discharge pipes 12, which join in a common delivery pipe 13, which discharges through a tangentially arranged outlet 14 near the top of the settling tank 5. The wash water outlet pipes 12 are each controlled by a suitable valve 15. When the filter is in operation the valves 15, of course, are closed.

The filtered condensate, after passing down through the filter bed, leaves the lower portion of the filter through the outlet 16 which delivers to the filtered water outlet pipe 17. At each filter the outlet 17 is controlled by a suitable filtered condensate discharge valve 18. Back wash water comes in through the main inlet pipe 19 which divides, as shown, to feed either of the two filters, there being a back wash inlet control valve 20 at each filter. After passing the valve 20 the back wash water is delivered through a suitable connection to the pipe 17 for delivery to the bottom portion of the filter through the connection 16.

Sometimes it is desirable to operate the two filters in series for which purpose I provide connecting pipe 21 and valve 22.

After back washing the residue of the wash water in the filter must be removed and the filter bed packed down for a subsequent filtering operation, to which end I provide for each filter a connection 23 between the pipe 17 and the pipe 12 near the bottom of the filter each of which connections is controlled by means of a valve 24.

At the bottom each filter may be provided with a suitable valve controlled drain 25.

The settling tank 5 is provided with an air vent pipe 26 having an upturned end 27 which extends up to a point closely adjacent the top center of the tank. The vent discharges at the outside of the tank through the downwardly extending end 28 under the control of valve 29.

At the bottom the settling tank 5 is provided with a suitable valved sludge removal pipe 30, and at a point in the lower portion of the tank intermediate the sludge layer and the supernatant water is a draw-off pipe 31 with an upturned inlet 32, which draw-off pipe projects outwardly through the side of the tank and delivers under the control of the valve 33 to draw-off pump 34. For some purposes the supernatant water so withdrawn may be used as is, but I prefer to return it to the condensate for further treatment. This may involve both the usual chemical treatment and the subsequent filtering treatment depending upon the needs of the particular installation. The pump 34, therefore, may deliver through a pipe 35 under the control of a valve 36 either directly to the condensate supply line 6, as shown, or to a condensate accumulating tank.

The operation of the system is as follows, referring to the left-hand filter only, since both filters operate in the same way and are normally used in alternation although, as stated above, they can upon occasion be used in series if special conditions make such series operation desirable. With all valves closed except 10 and 18 the treated contaminated condensate passes in to the upper portion of the filter 3 through the connection 8, and then downwardly through the filter and out at the bottom through the connection 16 for delivery through the clean water delivery pipe 17. When the filter needs cleaning the valves 10 and 18 are closed and the valves 20, 15 and 29 are opened, whereupon back wash water will pass into the bottom portion of the filter through pipe 17 and connection 16, and then outwardly through connection 8 and into pipe 12 for discharge through 13 and 14 into the settling tank 5, the capacity of the settling tank being sufficient to more than take all of the back wash water required. During this operation the air in the tank 5 is vented through the air vent 26—29. After the back wash water has been run to the tank 5, the residues thereof must be removed from the filter 3, and this is accomplished by closing the valves 15 and 20 and opening the valves 10 and 24, whereupon condensate will be delivered to the top of the filter in the usual way and the residues will be discharged through 23 and 24 into the wash water discharge pipe 12 for subsequent discharge into the settling tank 5 which is of sufficient capacity to receive such residue in addition to the back wash water already accumulated therein. This operation will not only remove the residues of the back wash water, but will also serve to pack down the filter bed before filtered water is again delivered to the delivery line 17 which latter, of course, takes place after closing the valve 24 and opening the valve 18.

The wash water accumulated in the settling tank 5 is now permitted to settle for whatever period of time may be required, say several hours, whereupon a sludge will accumulate in the bottom with a supernatant layer of relatively clean water thereabove. The supernatant layer is then withdrawn through the draw-off pipe 31 by means of the pump 34, the valves 33 and 36 being open and discharge taking place through the pipe 35 either directly into the condensate delivery pipe 6, as shown, or into a condensate accumulating tank depending upon what additional treatment it may be desired to give to the water which is withdrawn from the settling tank. In this way the back wash water may be returned to the system for further treatment and the sludge may be withdrawn from the tank 5 through the sludge outlet 30.

It will be seen that my system makes possible the reclaiming of by far the larger portion of the water used in washing the filters, which naturally reduces the load on the boilers by minimizing the amount of water which must be evaporated.

It will be understood that during either filling or emptying of the settling tank 5 it is always necessary to keep the air vent open.

I claim:

1. Apparatus for reclaiming condensate contaminated with chemically coagulated oil including a filter, a settling tank, a line for delivering contaminated condensate to the upper part of said filter, a line for discharging filtered condensate from the lower part of said filter, a controlling valve in each of said lines, a line for delivering back wash water to the lower part of said filter, a line for withdrawing the back wash water from the upper part of said filter and delivering it to the settling tank, a valve in each of said back wash lines, and a line for withdrawing the clean water from above the sludge in the settling tank.

2. The apparatus of claim 1 wherein means are provided for delivering the water which is withdrawn from the settling tank into the contaminated condensate.

3. The apparatus of claim 1 having further a line and a valve therein for removing the residue of the back wash water from the lower part of the filter and delivering it to the line which carries the back wash water from the filter to the settling tank.

4. The apparatus of claim 1 having further a sludge draw-off at the bottom of the settling tank.

5. The apparatus of claim 1 having further a pump in the line for withdrawing the clean water from the settling tank.

6. The apparatus of claim 1 wherein the settling tank is a closed tank and is provided with a valve air vent.

7. In a system for reclaiming condensate contaminated with chemically coagulated oil, the method which includes passing the contaminated condensate downwardly through a filter, then passing back wash water upwardly through the filter and delivering it to a settling tank, then washing out the residue of back wash water in the filter by again passing condensate through the filter in a downward direction, delivering the wash out water to the settling tank, then permitting settling in the settling tank, then withdrawing the supernatant water in the settling tank from a point above the accumulated sludge and delivering it to the incoming stream of contaminated condensate for treatment therewith.

CHURCHILL HUNGERFORD, Jr.